United States Patent [19]

Paterson

[11] 3,941,344

[45] Mar. 2, 1976

[54] MOTOR SUPPORT

[76] Inventor: Albert E. Paterson, 129 Madison, Twin Falls, Idaho 83301

[22] Filed: Apr. 20, 1973

[21] Appl. No.: 353,163

[52] U.S. Cl. .................. 248/351; 115/17; 248/4
[51] Int. Cl.² .......................................... B63H 5/12
[58] Field of Search ........ 248/4, 354 R, 351, 354 P; 280/179 R, 179 B, 414 R; 115/17

[56] References Cited
UNITED STATES PATENTS

| | | | |
|---|---|---|---|
| 2,772,799 | 12/1956 | Bridinger | 248/351 |
| 2,901,267 | 8/1959 | Holsclaw | 280/414 R X |
| 2,939,670 | 6/1960 | Anderson | 248/351 |
| 2,977,084 | 3/1961 | Brown et al. | 248/4 X |
| 3,059,883 | 10/1962 | Matthiessen | 248/351 X |
| 3,693,576 | 9/1972 | Driscoll | 248/4 X |

Primary Examiner—J. Franklin Foss
Attorney, Agent, or Firm—John W. Kraft; Charles L. Kraft, II

[57] ABSTRACT

The motor support comprises a substantially U-shaped yoke, a pedestal which is fastened to the base portion of the yoke, a retaining strap which is detachably engagable in rings in the yoke, and a swivel coupling which is mounted on the end opposite the yoke of the pedestal and which is engagable with a swivel mounted on the rearwardmost terminal end of a typical trailer frame.

1 Claim, 3 Drawing Figures

MOTOR SUPPORT

FIELD OF INVENTION

The present invention relates to accessories for boat trailers, and more particularly to a support for outboard motors mounted on boats carried on boat trailers.

DESCRIPTION OF THE PRIOR ART

An outboard motor mounted on a boat is particularly susceptible to damage as a result of the motor falling from its carrying position as a result of abrupt motions of a boat trailer during road transport. Means have been provided on commonly known outboard motor mounts to provide increased locking force in the motor mount clamp. These means tend to interfere with the typical structure of the motor mount in preparing and maintaining, and in controlling the outboard motor. Yokes have been provided both on the bost and the boat trailer to restrict movement of an outboard motor. These yokes frequently require a clamp means to be fastened to the motor to provide means for engaging the yoke with the motor. Some types of motor supporting yokes have required that the outboard motor be carried in a substantially verticle position during road transport; this requires additional lifting of the motor during launching and loading of the boat, which would defeat the purpose of tip-up outboard motor mounts. Thus, it may be seen that yoke and halter-type outboard motor supports have tended to be complicated, difficult to back and handle during launching and loading of the boat.

Accordingly, it is an object of the present invention to provide a simple support for outboard motors mounted on boats during road transport.

It is another object of this invention that the motor support be simple in its construction to permit reduced handling during launching and loading of a boat.

These and other objects shall become apparant from the description following, it being understood that modifications may be made without affecting the teachings of the invention here set out.

SUMMARY OF THE INVENTION

The motor support comprises a substantially U-shaped yoke, a pedestal which is fastened to the base portion of the yoke, a retaining strap which is detachably engagable in rings in the yoke, and a swivel coupling which is mounted on the end opposite the yoke of the pedestal and which is engagable with a swivel mounted on the rearwardmost terminal end of a typical trailer frame.

A more thorough and comprehensive understanding may be had from the detailed description of the preferred embodiment when read in connection with the drawings forming a part of this specification.

DETAILED DESCRIPTION OF THE PREFERRED EMBODIMENT

Figure 1:
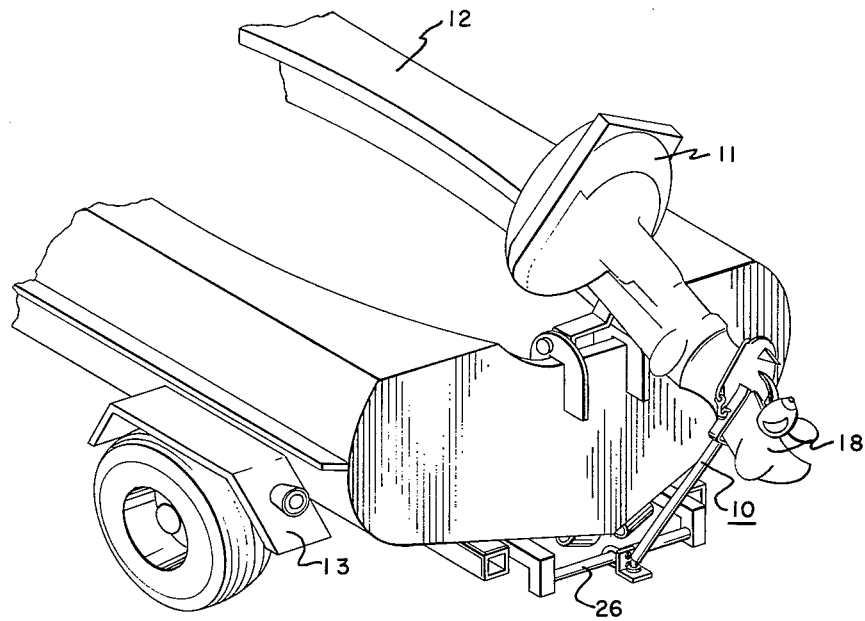
FIG. 1 is a left rear perspective view of the motor support of this invention shown in the environment of a boat trailer, boat and outboard motor.
Figure 2:
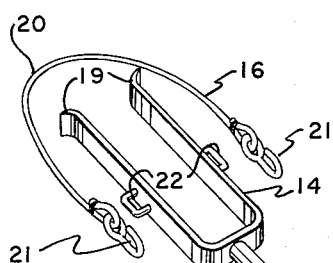
FIG. 2 is a perspective view of the motor support.
Figure 3:
FIG. 3 is a fragmentary, side elevational view of the motor support and with portions of its swivel base broken away for illustrative purposes.
Figure 3:
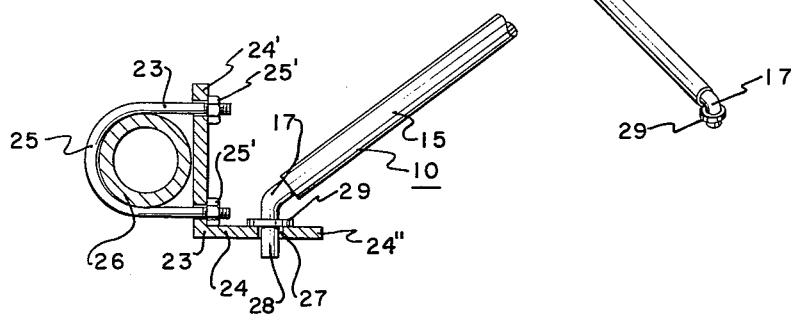

Referring now to the drawings and more particularly to the FIG. 1, the motor support of this invention is shown to advantage and generally identified by the numeral 10. The motor support 10 is intended to be employed to support and retain an outboard motor 11 mounted on a boat 12 when the boat 12 is carried on a boat trailer 13. As shown more clearly in the FIG. 2, the motor support comprises a yoke 14 and a pedestal 15, a restraining strap 16, and a swivel coupling 17.

The yoke 14 is a substantially U-shaped member. The pedestal 15 is a shaft member which is fastened at one of its terminal ends centrally in the base portion of the yoke 14. The yoke 14 has a suitable, predetermined configuration operable to slidably engage the lower propeller housing 18 of the motor 11, as shown in the FIG. 1. It has been found to advantage to roll the upper terminal ends of the yoke 14 outwardly with respect to the housing 18 to provide guides 19 to direct the propeller housing 18 between the legs of the yoke 14. It has also been found to advantage to laminate an elastomer to the interior, motor-contacting surfaces of the yoke 14 to cushion the housing 18 during tie-down and transport.

The restraining strap comprises a cord 20, and a hooks 21 secured to the terminal ends of the cord 20. The hooks 21 are engagable with rings 22 which are fastened to the outer terminal sides, distally below the guides 19 of the yoke 14. It has been found to advantage to fabricate the cord 20 of an elastic material.

The coupling 17 is mounted to the terminal end opposite the yoke 14 of the pedestal 15, and is engagable with a swivel 23. The swivel 23 comprises an angle iron support 24 and a U-bolt 25. The U-bolt 25 is engagable about the rearwardmost frame bar 26 of the boat trailer 13, and is intended to be secured through one of the legs of the angle iron 24 by bolts 25', to secure the angle iron 24 with one of its legs 24' in an upstanding position and its remaining leg 24'' in a substantially horizontal juxtaposition. The horizontal leg 24'' is provided with a hole 27. Couplings 17 is engagable with the hole 27 and comprises a shaft 28 and a collar 29. The shaft 28 is provided with a bend to project the pedestal 15 at an upward, outward, predetermined angle with respect to the rearwardmost terminal end of the boat trailer 13. The collar 29 is fastened distally from the lowermost terminal end of the shaft 28 to support the shaft 28 in the hole 27.

Referring again to the FIG. 1 the motor support 10 may be employed to support an outboard motor 11 by engaging the couplings 17 with the swivel 23, then engaging the yoke 14 with the motor propeller housing 18, and securing the strap 16 to the yoke 14, as set out above. The motor support 10 may be disengaged from the motor 11 by the reverse operation.

Having thtus described in detail a preferred apparatus which embodies the concepts and principles of the invention and which accomplishes the various objects, purposes and aims thereof, it is to be appreciated and will be apparent to those skilled in the art that many physical changes could be made in the apparatus without altering the inventive concepts and principles embodied therein. Hence, it is intended that the scope of the invention be limited only to the extent indicated in the appended claims.

I claim:

1. A motor support comprising a substantially U-shaped yoke; a pedestal which is fastened to the base portion of said yoke and retaining strap having means for detachably engaging said strap to said yoke wherein said means for detachably engaging said strap to said yoke includes a ring disposed centrally in each of the upstanding legs of said U-shaped yoke and a pair of hooks fastened to each of the terminal ends of said strap and which are engagable with said rings; and a swivel coupling which is mounted on the terminal end opposite said yoke of said pedestal, and comprises a substantially horizontally disposed plate fastened centrally in the rearwardmost terminal end of a boat trailer and a shaft being engagable with a hole in said plate disposed at a predetermined angle from the lowermost terminal end of said pedestal to project said pedestal at an upward outward predetermined angle with respect to said boat trailer, and having a collar disposed distally from the lowermost terminal end of said shaft.

* * * * *